United States Patent
Morse

(10) Patent No.: US 9,122,418 B2
(45) Date of Patent: Sep. 1, 2015

(54) METHOD OF CONTROLLING THE CAPACITY OF A VIRTUAL STORAGE SYSTEM, AND A VIRTUAL STORAGE SYSTEM

(75) Inventor: James S. M. Morse, Havant (GB)

(73) Assignee: XYRATEX TECHNOLOGY LIMITED—A SEAGATE COMPANY, Havant (GB)

(*) Notice: Subject to any disclaimer, the term of this patent is extended or adjusted under 35 U.S.C. 154(b) by 158 days.

(21) Appl. No.: 13/568,661

(22) Filed: Aug. 7, 2012

(65) Prior Publication Data

US 2014/0047208 A1 Feb. 13, 2014

(51) Int. Cl.
*G06F 3/06* (2006.01)

(52) U.S. Cl.
CPC .............. *G06F 3/067* (2013.01); *G06F 3/0605* (2013.01); *G06F 3/0644* (2013.01); *G06F 3/0665* (2013.01)

(58) Field of Classification Search
None
See application file for complete search history.

(56) References Cited

U.S. PATENT DOCUMENTS

| | | | |
|---|---|---|---|
| 7,117,336 B2 * | 10/2006 | Mimatsu et al. | 711/202 |
| 7,849,462 B2 * | 12/2010 | Traut et al. | 718/1 |
| 2004/0243731 A1 * | 12/2004 | Vu | 710/8 |
| 2005/0076157 A1 | 4/2005 | Serizawa et al. | |
| 2008/0077711 A1 * | 3/2008 | Cepulis | 709/250 |
| 2009/0113422 A1 * | 4/2009 | Kani | 718/1 |
| 2009/0210531 A1 * | 8/2009 | Melnikov | 709/226 |
| 2010/0011355 A1 * | 1/2010 | Carrigan et al. | 718/1 |
| 2010/0250748 A1 * | 9/2010 | Sivasubramanian et al. | 709/226 |
| 2011/0137868 A1 | 6/2011 | Sasage et al. | |
| 2011/0162041 A1 * | 6/2011 | Hwang et al. | 726/2 |
| 2012/0311257 A1 * | 12/2012 | Berman et al. | 711/115 |

FOREIGN PATENT DOCUMENTS

EP 2 144 152 1/2010

OTHER PUBLICATIONS

Pollock, Wayne. "Unix/Linux Administration Logical Volume Management Guide." Published Jul. 30, 2011. <http://web.archive.org/web/20110730063729/http://content.hccfl.edu/pollock/AUnix1/LVM.htm>.*

Wikipedia. "Virtual file system." Published Jul. 20, 2011. <http://en.wikipedia.org/w/index.php?title=Virtual_file_system&oldid=440492362>.*

United Kingdom Combined Search and Examination Report dated Jan. 13, 2014 in corresponding Great Britain Patent Application No. GB1313055.4.

* cited by examiner

*Primary Examiner* — Charles Rones
*Assistant Examiner* — Hewy Li
(74) *Attorney, Agent, or Firm* — Hollingsworth Davis, LLC

(57) ABSTRACT

A method of controlling the capacity of a virtual storage system provided on a physical storage system, the method including: providing a control program on the physical storage system; coupling additional virtual storage to the virtual storage system on the physical storage system; providing control data on the additional virtual storage; with the control program, reading the control data and configuring the virtual storage system accordingly. A corresponding virtual storage system is also provided.

20 Claims, 4 Drawing Sheets

METHOD OF CONTROLLING THE CAPACITY OF A VIRTUAL STORAGE SYSTEM, AND A VIRTUAL STORAGE SYSTEM

FIELD

The present invention relates to a method of controlling the capacity of a virtual storage system, a virtual storage system and a virtual server using such a method.

BACKGROUND

It is common nowadays for server and storage systems to be provided remotely on cloud-based systems, i.e. "in the cloud". Cloud-based systems provide a number of advantages. For example, they enable an organisation to have effectively unlimited storage capacity. They also enable an organisation to avoid or reduce concern regarding updates to systems and the like since the cloud administrator handles these matters. They also allow users access to the systems independently of their physical locations such that an employee for example could locate applications and data in the cloud wherever they were in the physical world.

It is also becoming more common that servers and storage system are provided, "virtually". Providing a machine virtually means providing a software implementation of a machine (i.e. a computer) that can execute programs like a physical machine. A virtual storage system is a virtually provided storage system. In such a virtual storage system, the definition of virtual storage devices (sometimes referred to as "virtual drives") and controllers is provided in software and has the effect that to the virtual storage system and the world outside, the virtual storage system appears as a conventional physical storage system. Of course, the virtual storage system is provided on one or more physical machines, but defined independently from the physical machine.

A virtual file system is also provided, which, as is known, is a means to organize data expected to be retained after a program terminates. The file system can provide procedures to store, retrieve and update data as well as manage the available space on the device(s) which contain it. Thus, a file system organizes data in an efficient manner and can be tuned to the specific characteristics of the device.

Although the advantages of cloud-based virtual storage systems are clearly manifest, in practice the process by which changes are made to storage capacity in cloud-based virtual storage systems, can be cumbersome and have a number of disadvantages.

Indeed, some problems can occur when an end-user of a cloud-based service wishes to increase (or decrease) the available virtual-disk space on a group of their machines (for example serving a cloud database application, e.g. Cassandra BigTable data). Ideally the user is able to select the group of machines on some web interface, select the virtual-drives to be changed, and specify how the virtual machines are to be changed. For example, the change could be a request to a virtual storage system service provider to increase the storage capacity to at least 250 GB in each virtual machine. Some time later the user will receive confirmation that this has been done. Ideally there is no interruption to the running services while this is done, but there can be significant delay between the time when a user inputs a request to the service provider to indicate a desire to change the storage capacity of the virtual system, and the time when the service provider acts on the request to implement the change.

Typically within a virtual server there will be provided the components associated with a conventional physical server, but provided virtually. For example, there will be virtual processors, virtual memory, virtual data connectivity and busses etc. An operating system is configured to run on the virtual server and a wrap-around program, often referred to as a "hypervisor", is also provided at a layer above the virtual operating system. The hypervisor serves to control access to the hardware and memory of the physical storage system or server on which the virtual machine is configured.

Currently the cloud service provider's responsibilities end at the hypervisor. Changing the capacity of a virtual-drive is often not possible because it depends on the file system in use in the virtual machine. To extend the capacity of an existing virtual-drive each virtual-machine would need to be stopped, the virtual-disk-image on the physical-drives grown, i.e. expanded to the required or desired size, and then the file system in the virtual-disk-image grown into the new space. Finally the virtual-machine can be started again.

It is not possible to perform these stages in parallel, i.e. to pipeline this process, as the data on the virtual-disks may not change while it is being copied or grown, so any application using the data would need to be stopped. The cloud service provider may be able to do this on behalf of the customer, but they would require full 'super user' access to the virtual machine.

Accordingly, with these problems in mind, to grow virtual-machine file systems today an alternative approach is to add a new drive of the required new capacity, and at an opportune moment, stop the application and copy all the data to the new, larger, virtual drive before starting the application again. When the virtual-machine can next be restarted, the old drive is removed. Storage is a shared resource, in that the storage may be shared between plural virtual storage systems on behalf of plural end users. The storage belongs to the service provider, and in effect is rented out to one or more users. A user will therefore be paying for double the capacity for the time period when the new drive has been added and the old one not yet removed. In other words, until the old virtual drive can be decommissioned, the user will have to pay for its capacity even though it is no longer needed as it has been superseded by the new larger virtual drive.

Some systems have attempted to address this problem. For example, Ext3, a commonly used file system for Linux, has experimental support for 'online growth', but not for online shrinking. Restrictions in the hypervisor and virtual operating system still mean that a virtual-drive would have to be removed and re-added for its new size to be discovered by the virtualised operating system. Furthermore, there is no scope for shrinking the file system while it is running.

In some architectures, the cloud services provider has no access to the virtual-machines running on their infrastructure, so any maintenance of the machine contents has to be done by the end-user.

Modern file systems such as Sun's ZFS and Linux's BTRFS have features that allow the file system to dynamically grow and shrink as drives are added and removed. These file systems often allow parts of the file system to be mirrored on different drives (virtual or physical), similar to RAID.

Linux's BTRFS is not yet mature, and ZFS is only properly supported on Solaris, so it is not yet common to use these file systems in a production environment. In fact due to these factors, it is not in fact recommended for any system where the data is important. In the next few years Linux's BTRFS will mature. Accordingly, it is expected that in time Linux's support for functions such as snapshot-ing, quotas and sub-volume management, will be brought to systems that use BTRFS.

Accordingly although it is possible that at some point in the future, once these features are available in cloud virtual-machines, it will be possible to grow and shrink file systems while applications are running, currently it is not. Furthermore, even when this does become possible, some or all of the problems mentioned above regarding user interaction with a virtual storage system will be encountered.

Extending the file-system of a running machine, as per the above use case, can be done by calculating how much extra space is required, attaching a new virtual-drive of the correct size, and extending the BTRFS file system on to it.

The process can also be done in reverse, with the file-system shrunk, and a redundant virtual-drive removed. Data can be compacted, with a new virtual-drive added, and the file system 'shrunk' off all the existing virtual-drives. Once redundant virtual-drives are no longer needed they can be removed from the virtual-machine.

FIG. 1 shows a schematic representation of a virtual storage system 4 provided in the cloud. This is an example of Infrastructure as a Service (IaaS), which is a well known cloud computing model. The system 4 is provided on a virtual server and comprises plural virtual disks 6 in a number and size sufficient to provide the specified capacity of the system 4. A virtual file system (not shown) is provided on the plural virtual disks 6. The virtual storage system 4 is provided in the cloud 8, shown schematically. Typically this will be provided in a network such as the internet 10, with the precise physical location of the server on which the virtual disks are configured being largely irrelevant. It will be appreciated that although shown schematically as an actual box 4 forming the virtual server the server itself could be formed as one server amongst many on a larger physical server.

There is hardware 16 that corresponds to the virtual server in that the virtual disks must physically be somewhere, but the actual hardware that forms the disks is irrelevant. In some cases for example, the virtual disk drives 6 forming a single virtual storage system 4 may be distributed on different physical servers 16 or storage systems. Logically though, they form the same virtual storage system. In the example of FIG. 1, the virtual storage system 4 is provided in a distributed manner in that physical storage from each of two physical storage systems 16 is used.

A hypervisor 21 is provided. As explained above, the hypervisor 21 serves to control access to the hardware and memory of the physical storage system or server(s) 16 on which the virtual storage system 4 is configured.

A user server 12 is connected to the internet 10 via some means of communication 14 which could be any known type of connection. For example an IP connection could be used which could be wired or wireless. Through interaction with the user server 12, a user is able to connect to the virtual storage system and exercise control over it. As explained above, if the user decides that additional storage capacity is required on the virtual storage system 4, problems can arise. Conversely, if he decides that the capacity of the virtual storage system 4 is too great and therefore he wants to reduce the capacity somehow, this can also cause problems.

SUMMARY

According to a first aspect of the present invention, there is provided a method of controlling the capacity of a virtual storage system provided on a physical storage system, the method comprising: providing a control program on the physical storage system; coupling additional virtual storage to the virtual storage system on the physical storage system; providing control data on the additional virtual storage; with the control program, reading the control data and configuring the virtual storage system accordingly.

A method is provided by which the storage capacity of a virtual storage system can be easily and efficiently changed without encountering the problems described above with current systems. A control program is provided, e.g. on the physical storage system or somewhere in the cloud, which is able to interact with a control data provided by a service provider to configure a virtual storage system as required or desired. In particular the use of the additional storage itself as the means by which control data is communicated to the virtual storage system provides both a novel and inventive way by which such virtual storage systems can be controlled. Importantly, using the present method, it is possible to so-called "hot plug" a new virtual drive into an existing virtual storage system without causing down time in the virtual storage system as a whole, as would occur using many of the known methods of varying the storage capacity of a virtual storage system.

Similarly, a virtual drive can be removed in a controlled fashion from a virtual storage system without causing down time in the virtual storage system as a whole.

Furthermore the system is flexible in that it can be used for the control of locally hosted virtual storage systems or remotely or cloud-based virtual storage systems.

In one example, the capacity of the virtual storage system is increased and the control data contains instructions to increase the capacity of the virtual storage system by a defined amount. The defined amount could be any required increment in memory capacity of the virtual storage system or file system. The defined amount would correspond to the size or capacity of a newly attached (or to be attached) virtual drive.

In one example, the capacity of the virtual storage system is decreased and the control data contains instructions to decrease the capacity of the virtual storage system by a defined amount. The defined amount could be any required decrement in memory capacity of the virtual storage system. The defined amount would correspond to the size or capacity of the virtual drive to be removed from the virtual storage system or file system.

In one example, the control data includes instructions to rebalance the virtual storage system once the capacity of the virtual storage system has been increased or decreased.

The present method uses the new virtual storage device to hold control data regarding the configuration of the virtual storage system as a whole. Thus it is possible to use the capacity of the newly added device to hold any required control data. In fact, the amount of control data required will almost always be an insignificantly small proportion of the actual capacity of the new virtual drive. This means that as well as simply containing control information regarding the capacity of the new virtual storage device and where it should be coupled to the existing virtual storage system, data regarding active steps that the virtual storage system should take can also be included. In this example, instruction to rebalance the virtual storage system as a whole is included.

In one example, the control data is provided as binary code in a computer readable language. Thus a simple and convenient means for providing the data to the resident on the virtual storage system is provided. It is preferred that the control data is transferred in this way since this offers an improved level of security. In particular it means that the control signals do not need to be sent to the virtual storage system by the end user. Rather, the request for additional storage is sent to the virtual server provided and the virtual storage system provider generates the new storage device with the required code.

In one example, the language in which the control data is written is XML. Any suitable language could be used, but XML is particularly preferred for many applications.

In one example, the method comprises, at a virtual storage service provider, receiving a request for a variation in storage capacity of a virtual storage system and in response thereto, automatically generating the control data within the additional virtual storage. Thus, the method provides an automated means by which a user can vary the storage capacity of their virtual storage system. Instead of having to engage directly with the virtual storage system, the user simply provides a request to the service provider which is then able to generate the required control data, or usually code, and allocate the is required additional physical storage so as to act on the user's request.

In one example, the virtual storage system has a virtual file system and the method comprises, when the capacity of the virtual storage system is increased or decreased, growing or shrinking the virtual file system, respectively. Thus as well as using the control data simply to increase the data capacity of the virtual storage system, the control data can also be used to grow or shrink the virtual file system on the virtual storage system. This therefore provides a way by which the virtual file system can be grown or shrunk whilst the virtual storage system remains on line. In other words a method of hot-plugging virtual storage is provided that automatically enables the corresponding file system to be grown or shrunk as required.

According to a second aspect of the present invention, there is provided a virtual storage system provided on a physical storage system, the virtual storage system comprising: a control program; one or more virtual drives on the physical storage system, the virtual drives providing the storage capacity of the virtual storage system; wherein the control program is arranged in use to read control data from one or more of the virtual drives and to configure the virtual storage system accordingly.

In one example, the capacity of the virtual storage system is arranged in use to be increased by the addition of one or more additional virtual drives, wherein the control data is provided on the one or more additional virtual drives.

In one example, the virtual storage system is a cloud-based virtual storage system.

In one example, the capacity of the virtual storage system is arranged in use to be decreased by the addition of one or more additional virtual drives containing control data which, when acted upon, causes the additional virtual drive and at least one of the previously present virtual drives to be removed from the virtual storage system. Thus, although initially the capacity will be increased (by the additional virtual drive), when the control data written or stored on the additional virtual drive is acted upon, the additional drive and one or more of the virtual drives that was already part of the virtual storage system will be removed so that the capacity of the virtual storage system is reduced.

In one example, the virtual storage system has a virtual file system, and the control program is arranged to grow or shrink the virtual file system.

According to a third aspect of the present invention, there is provided a method of controlling the capacity of a virtual drive provided on a physical storage system, the method comprising: providing a control program on the physical storage system; coupling additional virtual storage to the virtual drive on the physical storage system; providing control data on the additional virtual storage; with the control program, reading the control data and configuring the virtual drive accordingly

BRIEF DESCRIPTION OF THE DRAWINGS

Embodiments of the present invention will now be described in detail with reference to the accompanying drawings, in which.

DETAILED DESCRIPTION

In the present method, a way of controlling the capacity of a virtual storage system is provided. The method comprises providing a control program on the virtual storage system, and then coupling an additional virtual storage device (virtual drive) to the virtual storage system. Control data, to be described in detail below, is provided on the additional virtual drive. The control program provided on the virtual storage system is configured to read the control data stored on the additional virtual drive and configure the virtual drive and system accordingly. Thus, the additional virtual drive is itself used as the medium for transferring control data to the virtual storage system in such a way that enables an easy, convenient and flexible means to change the storage capacity of a virtual storage system. Importantly, this enables the resizing of a storage system whilst the storage system and its applications remain up and running.

Figure 1:
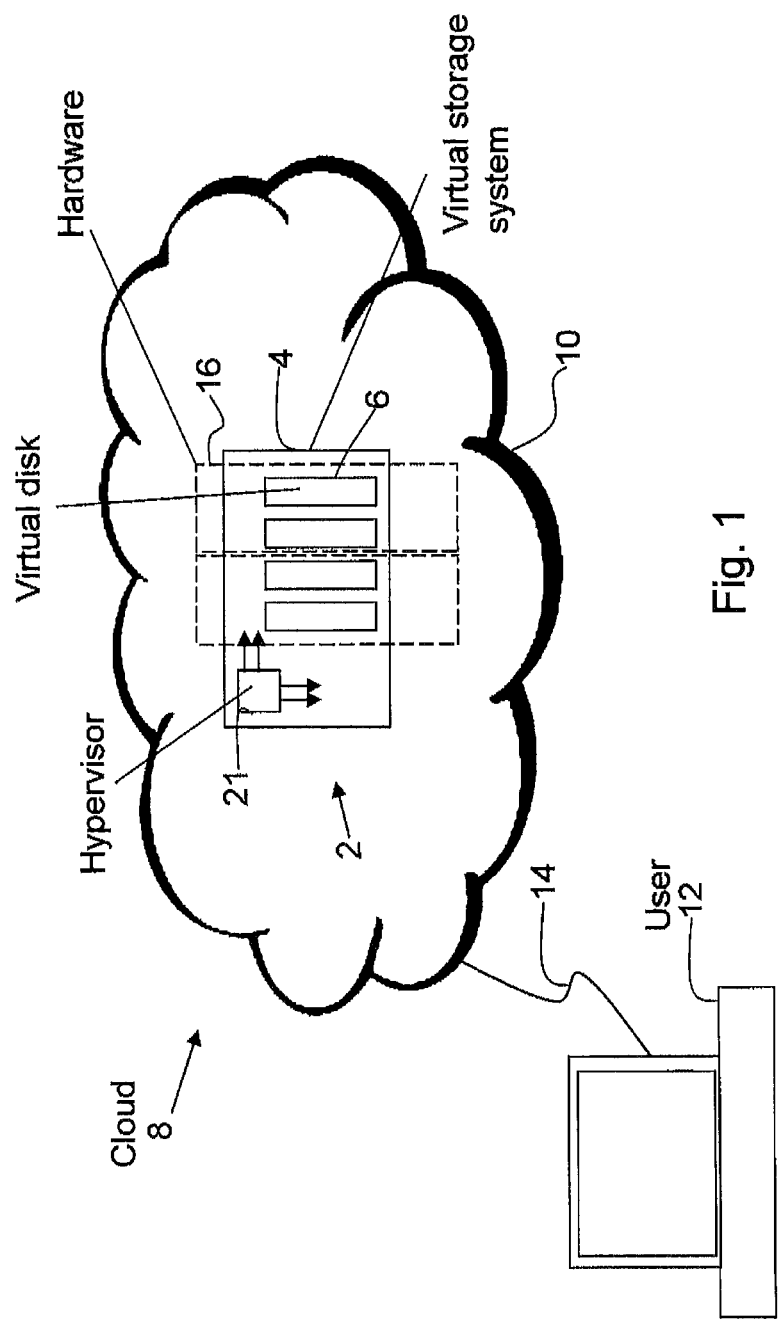
FIG. 1 is a schematic representation of a cloud-based storage system.
Figure 2:
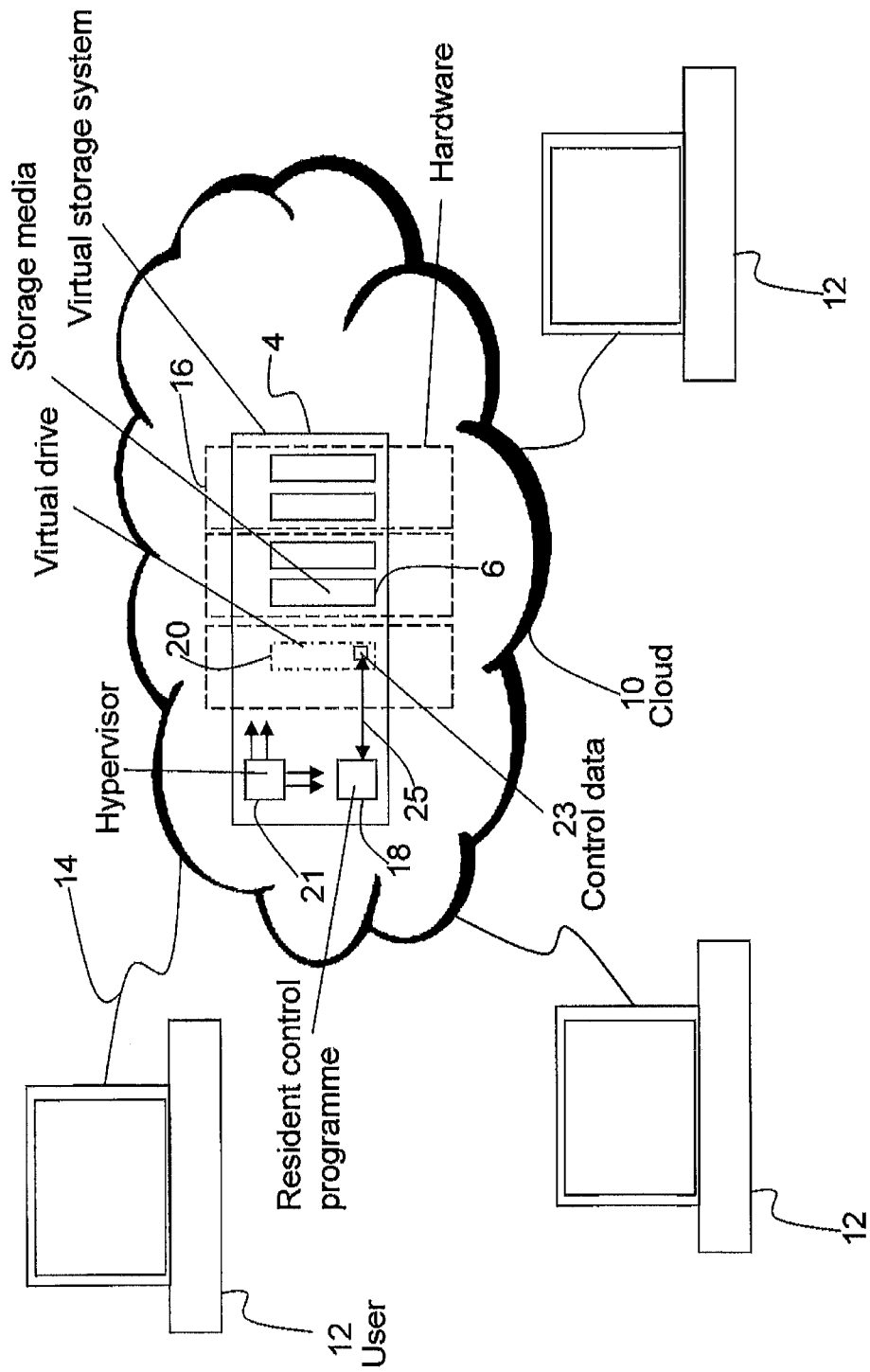
FIG. 2 is a schematic representation of a cloud-based storage system in accordance with an embodiment of the present invention.

FIG. 2 is a schematic representation of a virtual cloud-based storage system in accordance with an embodiment of the present invention. Like the system of FIG. 1, a virtual storage system 4 is provided in the cloud 10. The virtual storage system 4 includes a virtual file system (not shown) provided on plural virtual storage media or drives 6. Each of the plural virtual storage media or drives 6 has a storage capacity and the virtual storage system 4 is aware of its total storage capacity. A control program 18 or "resident" is provided on the virtual storage system 4. The resident or "agent" 18 serves to manage the coming and going of new virtual drives as will be explained below. As explained above, with reference to FIG. 1, the virtual storage system could be configured physically however required or desired by a user or provider. The virtual storage system, could be provided on a single physical storage system acting as a host to one or more virtual storage systems. Alternatively, the virtual storage system could be distributed across more than one physical storage system. The one or more physical storage systems could be provided locally to an end user or in the cloud.

In the example shown, a new virtual drive 20 is to be added to the virtual storage system 4 such that the capacity overall of the storage system 4 will increase. The virtual file system will also preferably grow to cover the added virtual storage. This is achieved in practice by providing control data 23 on the virtual drive 20 with which the resident program 18 interacts 25. The resident program 18 is thus able to read the control data 23 and configure the new virtual drive 20 and the storage system 4 as a whole.

A user 12 could communicate with the resident program 18 over IP or any other appropriate means. However it is preferred that any such communication with the resident program 18 is done securely so as to avoid security risks. For example communicating with the resident program 18 over IP could be a route for denial-of-service attacks. It will be appreciated that different cloud providers configure their networks differently. Some support private networks for machines in the same group whereas others might offer bridge networking or tunnels.

In the present method, the resident or control program 18 is communicated with via the addition and removal of virtual drives. When a new virtual drive is added, the resident program 18 is arranged to scan the virtual drive for a special partition or GPT label, or even a prefix in the serial number. The resident program then serves to read instructions provided on the virtual drive which could be to grow the data or file system onto this virtual disk or even shrink the file system off the new virtual drive 20. Once the resident program 18 has finished with a virtual drive, it can mark it for removal by notifying the hypervisor 21 or, for example, issuing an ATA_SECURE_ERASE to the virtual SCSI-IDE drive. Virtual USB drives can just be ejected and their USB port disabled. These actions would signal to the hypervisor 21 that the virtual storage system 4 has finished with the virtual drive and that it can be detached from the virtual storage system 4 and its content erased. The end user 12 would then stop paying for the disk space of the now removed virtual drive.

BTRFS includes redundant copies of file data and file system metadata. This allows BTRFS to be fault tolerant if a drive fails. If information about this redundancy data can be exposed to lower layers, features can be added to the service-providers system that make administering the underlying 'real' file system easier. For example, if redundancy is in use in the virtual-storage system, only some of the underlying virtual-disk or storage device images need to be backed up by the service provider, as content can be restored from either set of images. If a clustered file system, (such as lustre), is in use to store the machine images, then different redundant files can be written to different physical storage pools, thus alleviating some performance problems or bottlenecks (for example, during RAID rebuilds VMs could write to 'the other' virtual-drive, and rebalance once the physical rebuild has finished). If invasive maintenance needs to be done, it should be possible to remove up to half the storage pools in the clustered file system. This would appear to the Virtual Machines as if individual virtual-drives in their redundant sets had failed.

There will now be described in detail an example of the way by which a virtual disk can be added to a virtual storage system so as to increase the capacity of the virtual storage system.

Considering the first example, a user would like to increase the storage capacity of a virtual storage system by 100 GB. To do this, first the user visits the service provider's interface which might be on a Web portal. A command is issued to the provider to grow the file system by the desired amount. A physical machine resident program is arranged to allocate the required capacity on the physical file system. Indeed, in this example, a command is issued to grow the file system mounted at "/data" by 100 GB.

The physical machine resident program of the provider then creates a single 100 GB file on the physical drive file system and writes corresponding control data into the beginning of the 100 GB file. The control data is to be read by the resident program 18 on the virtual machine and will enable the resident program 18 to generate or control the extension to the existing virtual file system. The control data could be written in any appropriate language that the resident program 18 can read and interpret. Typically, this might be provided as XML code.

An example of the control data that might be provided by the physical machine resident program within the 100 GB file is as follows

```
<update mountpoint="/data">
    <vdrive action="add" serial="this"/>
    <btrfs action="balance"/>
    <signature provider="091840915"/>
</update>
```

As can be seen, initially, a mount point is defined as /data. Next, an instruction indicates that this virtual drive is to be added to the existing virtual file system. Next, a balance command is given in respect of the virtual file system. As can be seen, in this example, the file system is a BTRFS system. The balance command serves to ensure that data stored on the previously existing drives within the virtual storage system is balanced between the existing virtual drives and the new drive recently added to the virtual storage system as well. Last, a signature is provided which is a security feature to indicate that the request originated with the provider. The inclusion of a signature within the control data provides a high level of security to the system.

The XML code shown above is merely exemplary. It shows how data that can be read by and interpreted by the resident program 18 on the virtual machine is provided within the new virtual disk to enable configuration of the virtual storage system as a whole. In particular, the balance command is clearly a command that relates to the storage system as a whole and not merely the newly-added virtual drive.

This XML identifies the mount-point in the virtual machine, (provided by the end-user) and provides two instructions. The first instruction is to 'add' a drive to the file-system, 'this' is a special serial number that indicates the drive that contains the instructions. The second command instructs BTRFS to 'balance' the virtual file-system. The final section of XML is a signature that shows that these commands have come from the provider. The 'resident' program on the virtual-machine can validate the signature to confirm this is a 'real' update. As explained above, the use of control data provided on a virtual drive can be used to enable the storage capacity of a virtual storage system to be increased. As explained herein it is preferable that the control data is used to grow the virtual file system as well as the basic storage capacity. Thus, as well as increasing the storage capacity, the virtual file system itself is extended.

In one example, it is possible that the end-user 12 generates the XML code themselves and includes an extra end user signature which is also checked by the virtual machine. In this case, an additional level of security is provided.

As explained above, although it is likely to be more common that the method is used when adding virtual disks to a virtual storage system, the flexibility of the use of control data within a virtual disk which engages with a resident program, means that the method can also be used to remove a virtual disk from a virtual storage system.

There follows an example of XML code which will achieve this effect.

```
<update mountpoint="/data">
    <vdrive action="remove" serial="1536136234"/>
    <vdrive action="remove" serial="this"/>
    <signature provider="459872494"/>
</update>
```

This indicates that a particular drive and the drive containing the instructions are to be removed. Thus, there are two "remove" commands. One relates to the drive in the existing virtual storage system and the second relates to the virtual drive added to enable the control to be effective.

Figure 3:
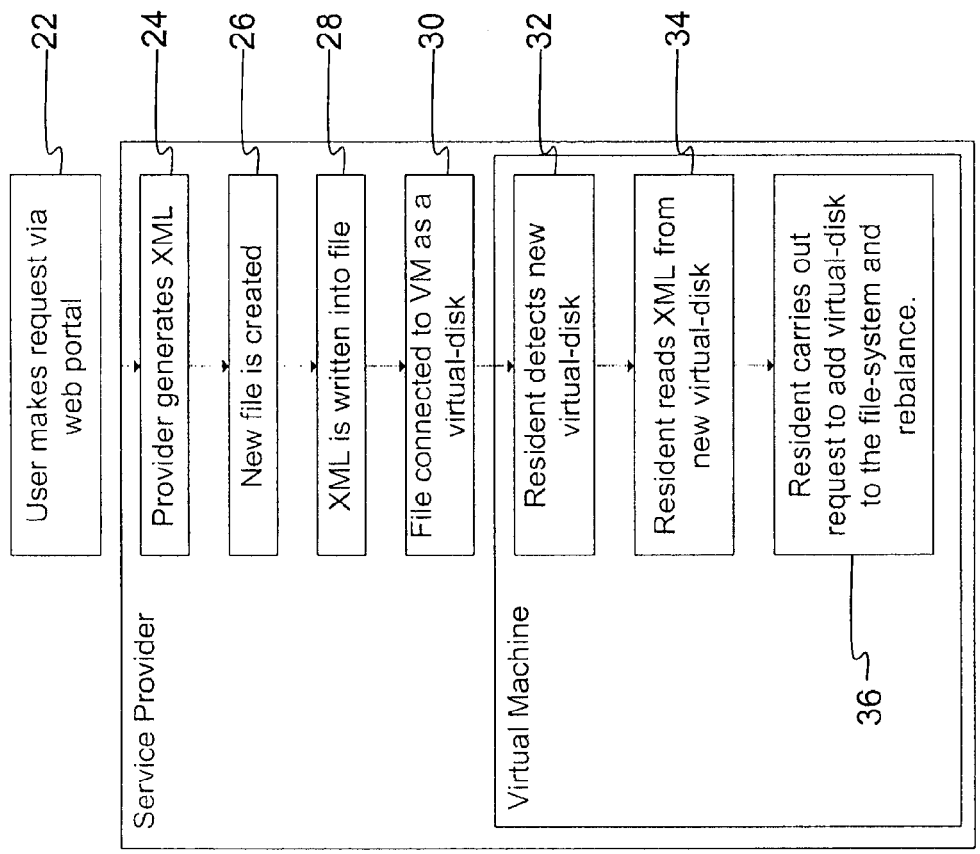
FIG. 3 is a schematic representation of a flow diagram showing the steps in configuring a cloud-based storage system; and, FIG. 4 is a schematic representation of a physical storage system containing plural virtual storage systems.

FIG. 3 shows a schematic flow diagram representing the process for adding a virtual drive to a virtual storage system.

Initially at step 22, a user makes a request via a user interface which is typically provided on a web portal. The request is made to a service provider for a change in the storage capacity of a virtual storage system. The example of FIG. 3 is one in which a virtual disk is being added to a storage system. However, as explained above, the method would work, with appropriate modification, where a virtual disk is to be removed from a storage system.

Once the user has made this request, the method preferably proceeds automatically such that no further interaction from the user is required. In other words, at the virtual storage service provider, a request for a variation in storage capacity of a virtual storage system is received. In response to this, the control data within the additional virtual storage is automatically generated (by the virtual storage service provider). Thus, the method provides an automated means and method by which a user can increase or decrease the storage capacity of their virtual storage system. Whereas conventionally, some direct contact with the virtual storage system might have been required, in the present method, the user simply provides a request to the service provider which is then able to generate the required control data and allocate the required additional physical storage so as to action the user's request.

Thus, at the service provider XML 24 is generated. Next, a new file is created 26. Next, at 28 the generated XML is written into the file. Next, the file is connected to the virtual machine as a virtual disk at step 30.

As explained above, the virtual machine includes a resident program 18. At step 32, the resident program 18 detects the presence of the new virtual disk 20. The resident program 18 reads the XML code from the new virtual disk 20. Last, at step 36 the resident carries out a request to add the virtual disk to the file system and performs any necessary rebalancing. Thus, a secure and efficient means and method is provided by which the capacity of a virtual storage system can be changed.

Figure 4:
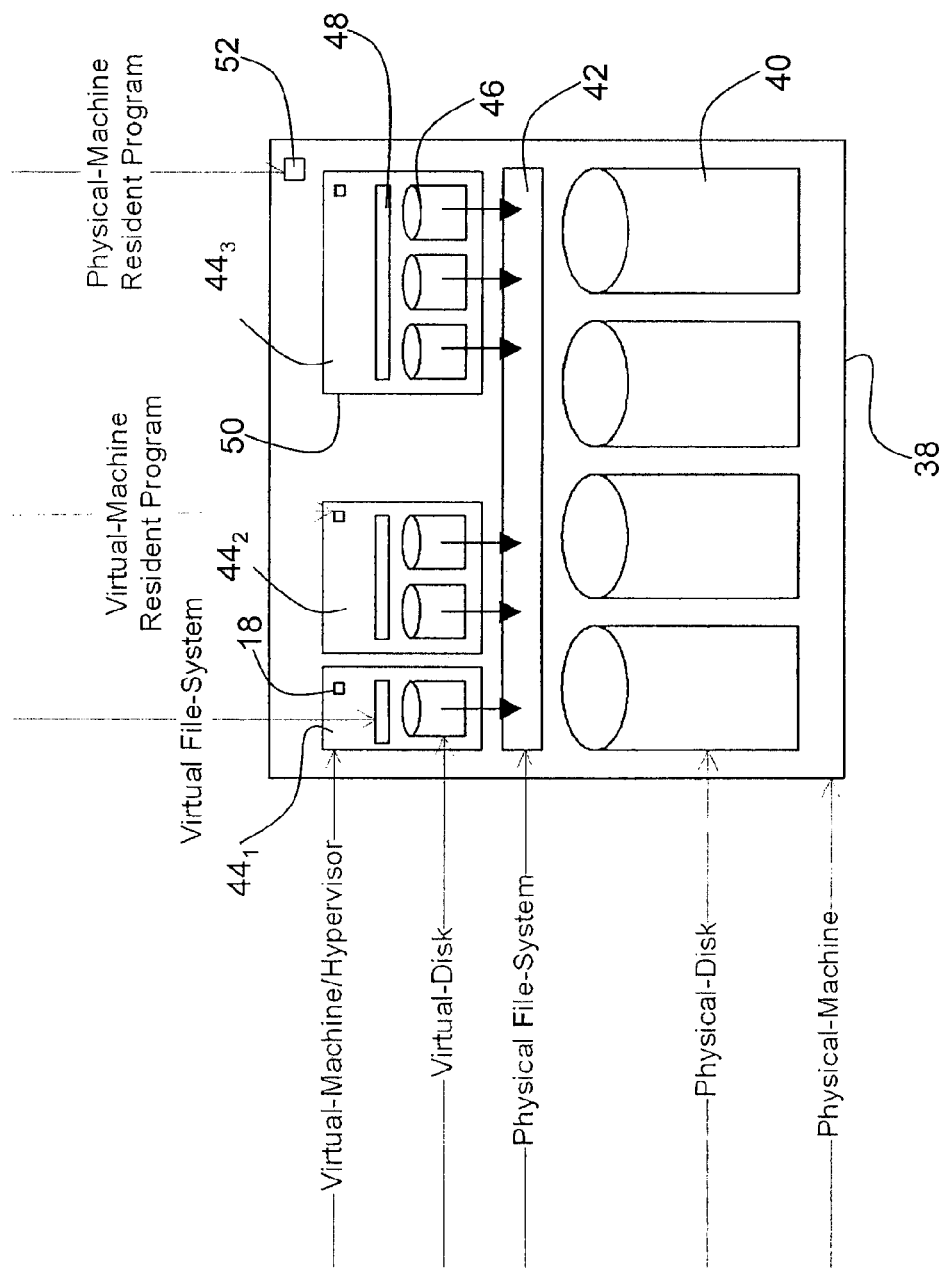

FIG. 4 shows a further example of a schematic representation of a virtual storage system. In this case a physical server 38 is provided. The server 38 has plural hard disks 40, or other forms of storage such as solid state drives (SSDs) etc. A physical file system 42 is provided on the server 38, which provides the known functions of a file system as described above, e.g. provides procedures to store, retrieve and update data as well as manage the available space on the device(s) which contain it. Configured on the physical file system are plural virtual storage systems $44_1$ to $44_3$. As shown, each of the virtual storage systems comprises one or more virtual drives 46. A virtual file system 48 is provided on each of the virtual storage systems $44_1$ to $44_3$.

A hypervisor 50 is provided for each of the virtual storage systems $44_1$ to $44_3$. The hypervisor for each of the virtual storage systems may be thought of as a container for the virtual machine. Thus, on a running system, the hypervisor shows up as a program running on the physical-machine. Although in FIG. 2, the hypervisor 21 is shown as being a component of the virtual machine, it will be understood that its function is as described generally herein.

A resident program 18 is provided on each of the virtual storage systems, as explained above with reference to FIG. 2. In addition, a physical machine resident program 52 is arranged to allocate the required capacity on the physical file system 42. Thus, whereas the resident program 18 is provided on the virtual machine to read and act upon the control data in the new virtual drive, the physical machine resident program 52 is arranged on the physical machine to provide a first action in response to a user request for a change in the capacity or file system of a virtual storage system.

As well as providing the above described method, a storage system is provided arranged to operate in accordance with the described method. The storage system comprises a physical storage system including plural storage media such as hard disk drives and the like.

Embodiments of the present invention have been described with particular reference to the examples illustrated. However, it will be appreciated that variations and modifications may be made to the examples described within the scope of the present invention.

The invention claimed is:

1. A method of controlling the capacity of a virtual storage system provided on a physical storage system, the method comprising:
   providing a control program, and in response to a request for a change in storage capacity of the virtual storage system:
      generating control data based on the request, the control data comprising instructions to change the storage capacity of the virtual storage system;
      providing the control data to additional virtual storage;
      adding the additional virtual storage to the virtual storage system on the physical storage system to provide the control data to the control program; and
      after adding the additional virtual storage, the control program;
         reading the control data; and
   changing the storage capacity of the virtual storage system based on the control data.

2. The method according to claim 1, in which the capacity of the virtual storage system is increased and the control data contains instructions to increase the capacity of the virtual storage system by a defined amount.

3. The method according to claim 1, in which the capacity of the virtual storage system is decreased and the control data contains instructions to decrease the capacity of the virtual storage system by a defined amount.

4. The method according to claim 1, in which the control data includes instructions to rebalance the virtual storage system once the capacity of the virtual storage system has been increased or decreased.

5. The method according to claim 1, in which the control data is provided as binary code in a computer readable language.

6. The method according to claim 5, in which the language is human-readable but in a machine readable structure, that includes XML, YAML or JSON.

7. The method according to claim 1, comprising at a service provider, receiving the request for a variation in storage capacity of the virtual storage system and in response thereto, automatically generating the control data within the additional virtual storage.

8. The method according to claim 1, in which the virtual storage system has a virtual file system and the method comprises, when the capacity of the virtual storage system is increased or decreased, growing or shrinking the virtual file system, respectively.

9. The method according to claim 1, in which the additional virtual storage is an additional virtual drive.

10. A virtual storage system provided on a physical storage system, the virtual storage system comprising:
   a control program stored on the physical storage system;
   one or more virtual drives on the physical storage system, the virtual drives providing storage capacity of a virtual storage system;
   wherein, in response to a request for a change in storage capacity of the virtual storage system, control data is generated that comprises instructions to change the storage capacity of the virtual storage system, the control data being provided to an additional virtual drive;
   wherein the control program, in response to the request:
      adds the additional virtual drive to the virtual storage system on the physical storage system to read the control data; and
      changes the storage capacity of the virtual storage system based on the control data.

11. The virtual storage system according to claim 10, wherein the capacity of the virtual storage system is increased by the addition of the additional virtual drive containing the control data.

12. The virtual storage system according to claim 10, wherein the capacity of the virtual storage system is decreased by the addition of the additional virtual drive containing the control data which, when acted upon, causes the additional virtual drive and at least one of the previously present virtual drives to be removed from the virtual storage system.

13. The virtual storage system according to claim 10, in which the virtual storage system is a cloud-based virtual storage system.

14. The virtual storage system according to claim 10, in which the virtual storage system has a virtual file system, and in which the control program grows or shrinks the virtual file system.

15. The method according claim 2, in which the control data includes instructions to rebalance the virtual storage system once the capacity of the virtual storage system has been increased or decreased.

16. The method according to claim 2, comprising at a service provider, receiving a request for a variation in storage capacity of a virtual storage system and in response thereto, automatically generating the control data within the additional virtual storage.

17. The method according to claim 7, in which the virtual storage system has a virtual file system and the method comprises, when the capacity of the virtual storage system is increased or decreased, growing or shrinking the virtual file system, respectively.

18. The method according to claim 8, in which the additional virtual storage is an additional virtual drive.

19. The virtual storage system according to claim 11, in which the virtual storage system is a cloud-based virtual storage system.

20. A virtual storage system provided on a, the virtual storage system comprising:
   a control program stored on the physical storage system;
   one or more virtual drives on the physical storage system, the virtual drives providing storage capacity of a virtual storage system; and
   a virtual file system,
   wherein, in response to a request for a change in storage capacity of the virtual storage system, control data is generated that comprises instructions to change the storage capacity of the virtual storage system, the control data being provided to an additional virtual drive;
   wherein the control program, in response to the request:
      adds the additional virtual drive to the virtual storage system on the physical storage system to read the control data; and
      changes a capacity of the virtual file system based on the control data.

* * * * *